United States Patent
Budka et al.

(10) Patent No.: US 7,224,983 B2
(45) Date of Patent: May 29, 2007

(54) METHOD AND APPARATUS FOR GEOLOCATION ESTIMATES IN WIRELESS NETWORKS

(75) Inventors: Kenneth C. Budka, Marlboro, NJ (US); Doru Calin, Freehold, NJ (US); Tingfang Ji, Highland Park, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 279 days.

(21) Appl. No.: 10/338,222

(22) Filed: Jan. 8, 2003

(65) Prior Publication Data

US 2004/0203912 A1    Oct. 14, 2004

(51) Int. Cl.
    *H04Q 7/20* (2006.01)
(52) U.S. Cl. .............................. 455/456.1; 455/456.6; 455/456.5; 455/457; 455/422.1; 455/421; 455/440; 370/328; 370/338
(58) Field of Classification Search .. 455/456.1–456.6, 455/422.1, 420, 440, 67.11, 39, 457, 421; 370/328–338
See application file for complete search history.

(56) References Cited

U.S. PATENT DOCUMENTS

| | | | | |
|---|---|---|---|---|
| 5,724,660 | A * | 3/1998 | Kauser et al. | 455/456.2 |
| 6,249,252 | B1 * | 6/2001 | Dupray | 342/450 |
| 6,411,819 | B1 * | 6/2002 | Gutowski | 455/525 |
| 6,681,099 | B1 * | 1/2004 | Keranen et al. | 455/67.16 |
| 6,694,142 | B1 * | 2/2004 | Kuwahara et al. | 455/456.1 |
| 6,697,628 | B1 * | 2/2004 | Green et al. | 342/357.01 |
| 6,771,625 | B1 * | 8/2004 | Beal | 370/336 |
| 2002/0055362 | A1 * | 5/2002 | Aoyama | 455/456 |
| 2003/0119559 | A1 * | 6/2003 | Chitrapu | 455/562 |
| 2003/0222819 | A1 * | 12/2003 | Karr et al. | 342/457 |
| 2003/0222820 | A1 * | 12/2003 | Karr et al. | 342/457 |
| 2004/0002346 | A1 * | 1/2004 | Santhoff | 455/456.1 |
| 2004/0087315 | A1 * | 5/2004 | Dufva et al. | 455/456.1 |
| 2004/0248587 | A1 * | 12/2004 | Niemenmaa | 455/456.1 |
| 2004/0259566 | A1 * | 12/2004 | Maanoja et al. | 455/456.1 |

OTHER PUBLICATIONS

"An Overview of the Challenges and Progress in Meeting the E-911 Requirement for Location Service," J. H. Reed et al., IEEE Communications Magazine, Apr. 1998, pp. 30-37.

"Overview of Radiolocation in CDMA Cellular Systems", J. J. Caffery, Jr. and G. L. Stuber, IEEE Communications Magazine, Apr. 1998, pp. 38-45.

3GPP TS 25.305 V5.4.0 (Mar. 2002), Technical Specification, 3rd Generation Partnership Project; Technical Specification Group Radio Access Network; Stage 2 functional specification of User Equipment (UE) positioning in UTRAN (Release 5).

* cited by examiner

*Primary Examiner*—Joseph Feild
*Assistant Examiner*—Khai Nguyen

(57) ABSTRACT

A method and apparatus for increasing the accuracy and reliability of geolocation estimates for wireless communication networks devices includes calculating a geolocation estimate of a wireless communication device for a plurality of time periods, and selecting from the plurality of calculated geolocation estimates, a most reliable geolocation estimate of the wireless communication device.

27 Claims, 4 Drawing Sheets

250

300

METHOD AND APPARATUS FOR GEOLOCATION ESTIMATES IN WIRELESS NETWORKS

FIELD OF THE INVENTION

This invention relates to the field of wireless communication systems and, more specifically, to the geolocation of mobile units in wireless networks.

BACKGROUND OF THE INVENTION

In wireless networks, base stations typically broadcast "pilot signals." Pilot signals are known and monitored by subscriber equipment (such as mobile units) within a cell area, and are used, for example, in power measurements and in the generation of coherent phase references. Each base station of a system transmits a respective pilot signal that enables the subscriber equipment to distinguish the transmissions of different base stations from each other. Measurements of the relative strengths of detected pilot signals allow mobile units to quickly connect to the nearest base station when they first power on, and allow them to help quickly determine the best candidate base stations during handoffs (switching of serving base station).

Another application of pilot signals is in the geolocation of mobile units. Using information on the positions of base stations and measurements of the detectable pilot signals of nearby base stations made by the mobile units, triangulation techniques can be used to determine the mobile unit's most likely position. Mobile geolocation techniques are a critical component of "Enhanced-911" and other location-based services.

In Code Division Multiple Access (CDMA) based systems and Universal Mobile Telecommunication System (UMTS) networks in particular for example, base stations continually broadcast pilot signals that are spread using a known (standardized) pseudo-random sequence. All base stations in a UMTS network use the same pilot sequence; however, pilot sequences used by base stations are offset from one another in time.

UMTS mobile units (and terminals in other Code-Division Multiple Access (CDMA) based technologies) are capable of measuring the relative phase differences between detected pilot sequences. The estimates of the relative phase difference of detectable pilot signals are then used by the Observed Time Difference of Arrival (OTDOA) geolocation method outlined in the UMTS system specifications to determine a mobile unit's position.

In implementing current geolocation methods employing triangulation of pilot signal measurements of serving and neighboring base stations, pilot signals from at least three different base stations are required to accurately estimate the position of a user. However, due to the inference-limited nature of CDMA-based systems such as UMTS, detecting pilot signals from two or more neighbor base stations is often not possible over a large portion of the cell's coverage area. It is well known, for example, that due to the near-far effect, when all base stations are transmitting at maximum power, in over ~40% of the cell's coverage area (the region nearest the base station), only the pilot signal from the serving base station will be detectable by the mobile unit. When only a single base station is detectable, the error of the geolocation estimate is unacceptably high. This error can cause geolocation algorithms to fail to satisfy the stringent position error requirements outlined by the U.S. Federal Communications Commission—an error of less than 100 m 67% of the time, and less than 300 m 95% of the time for network-based solutions, and less than 50 m 67% of the time and less than 150 m 95% of the time for handset-based solutions.

In an attempt to correct for the near-far effect and to increase the chances of mobile units detecting two or more pilot signals from neighboring base stations, an Idle Period in DownLink (IPDL) method has been introduced in the UMTS system specification. The IPDL solution decreases system-wide interference by temporarily switching off the serving pilot signal for a period of time. This solution has significant drawbacks, however. The temporary muting of pilot signals adversely affects the performance of the downlink channel for on-going calls, increasing frame error rates. Implementing IPDL requires architectural changes to the UMTS network and complicates critical functions such as downlink power control.

SUMMARY OF THE INVENTION

The present invention advantageously provides a method and apparatus for increasing the accuracy and reliability of geolocation estimates for wireless communication devices, such as remote units, in wireless communication networks.

In one embodiment of the present invention a method includes calculating a geolocation estimate of a wireless communication device for a plurality of time periods, and selecting from the plurality of calculated geolocation estimates, a most reliable geolocation estimate of the wireless communication device.

In another embodiment of the present invention a method includes a) receiving information from a wireless communication device, the information including measurements taken by the wireless communication device of detected pilot signals from at least one base station, determining a time interval in which the wireless communication device continues to take measurements when fewer than three (3) base stations are detected by the wireless communication device, selecting a most reliable measurement taken by the wireless communication device among the measurements taken by the wireless communication device when fewer than three (3) base stations are detected by the wireless communication device, and calculating a geolocation estimate of the wireless communication device using the selected most reliable measurement.

BRIEF DESCRIPTION OF THE DRAWINGS

The teachings of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION OF THE INVENTION

The present invention advantageously provides a method and apparatus for increasing the accuracy and reliability of geolocation estimates for wireless communication devices, such as remote units, in wireless communication networks. Although an embodiment of the present invention will be described within the context of a Universal Mobile Telecommunication System wireless network, it will be appreciated by those skilled in the art that the present invention can be advantageously implemented in various other networks, based on CDMA or other multiple access technologies, using various geolocation techniques wherein more reliable and accurate geolocation of a wireless communication device, such as a remote unit, is desired. The invention applies to any type of remote terminals that can communicate with a network.

Figure 1:
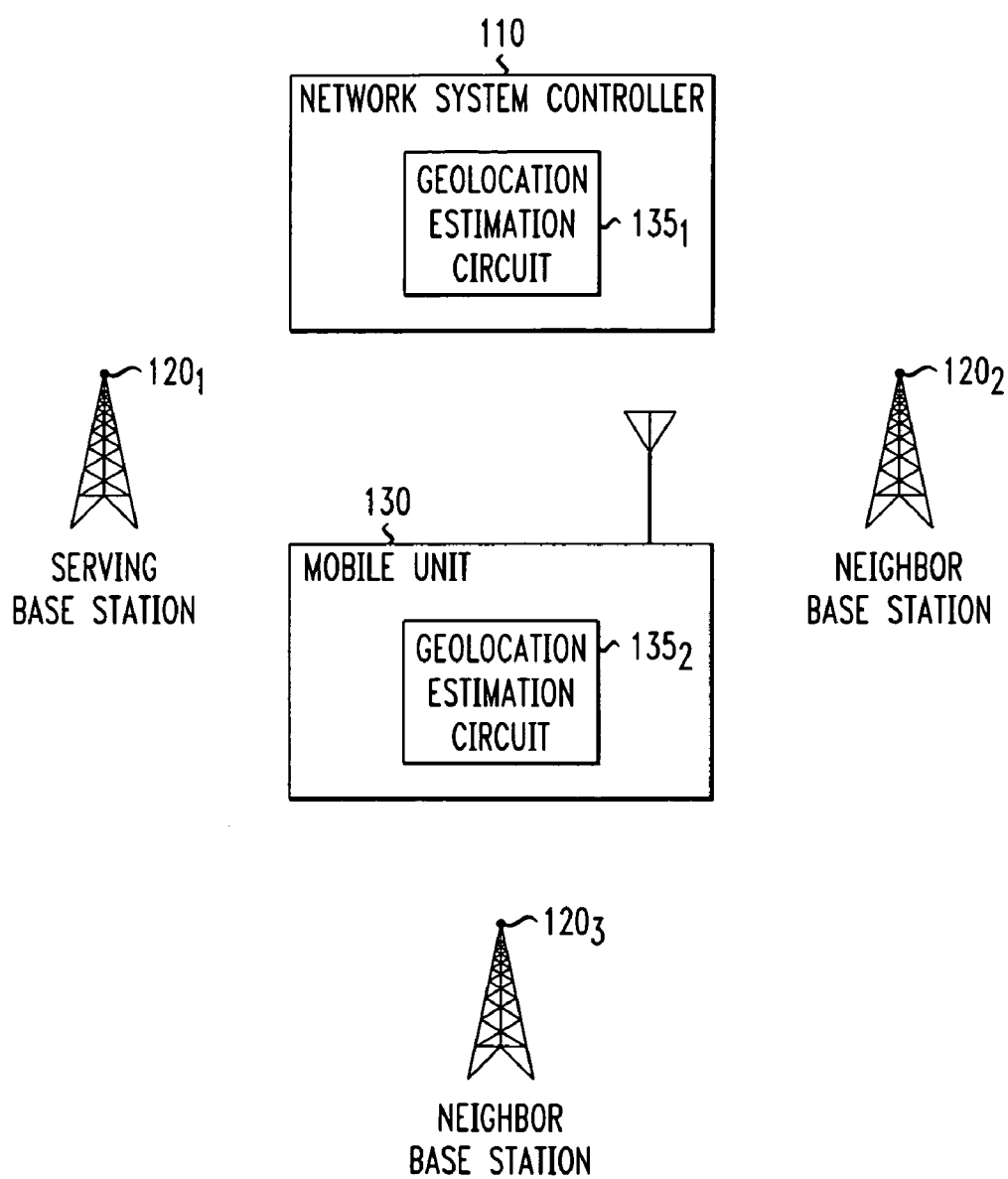
FIG. 1 depicts a high level block diagram of a Universal Mobile Telecommunication System (UMTS) wireless network including an embodiment of the present invention.

FIG. 1 depicts a high level block diagram of a Universal Mobile Telecommunication System (UMTS) wireless network including an embodiment of the present invention. The UMTS wireless network 100 of FIG. 1 comprises a network system controller 110, a plurality of base stations (illustratively three base stations) 1201, 1202, 1203 (collectively base stations 120), and a wireless communication device (illustratively a mobile phone) 130. The network system controller 110 and the mobile unit 130 each, illustratively, include geolocation estimation circuits 1351 and 1352 (collectively geolocation estimation circuits 135). A geolocation estimation circuit 135 may be located either in the network controller 110, namely geo-location estimation circuits 1351, or the mobile unit 130, namely geo-location estimation circuits 1352, or in both network controller and mobile (collectively geo-location estimation circuits 135). The geolocation process is commonly referred to as remote-positioning if it is supported by the network controller and self-positioning if it is supported by the mobile terminal. Note that the self-positioning can be supported only if the mobile terminals are equipped with a geo-location estimation circuit 1352. Although the geolocation estimation circuits 135 are described as circuits, it will be appreciated by those skilled in the relevant art that, within the teachings of the present invention, the functions of the geolocation estimation circuits can be performed by software and still be within the concepts of the present invention.

In the UMTS wireless network 100, the base stations 120 continually broadcast pilot signals that are offset from one another in time. The mobile unit 130 measures the relative phase differences between the detected pilot signals. In the case of network-based position estimates, the mobile unit 130 provides the network system controller 110 with measurements of the relative phase differences in detectable pilot signals from neighbor base stations (illustratively base units 1202 and 1203) compared to the serving base station (illustratively base unit 1201). The network system controller 110 then uses this data and known positions of the base stations 120 to estimate the most likely position of the mobile unit 130 using the geolocation estimation circuit 1351. In the case of User Equipment-based methods, the network system controller 110 provides the mobile unit 130 with information on the location of the detected base stations 120 so that the mobile unit 130 can determine its most likely position based on relative phase measurements using the geolocation estimation circuit 1352. As depicted, the UMTS wireless network 100 of FIG. 1 supports both "network-based" and "User Equipment-based" geolocation. Alternatively, the information regarding the location of the base stations 120 can also be stored in a memory of the mobile unit 130.

Figure 2:
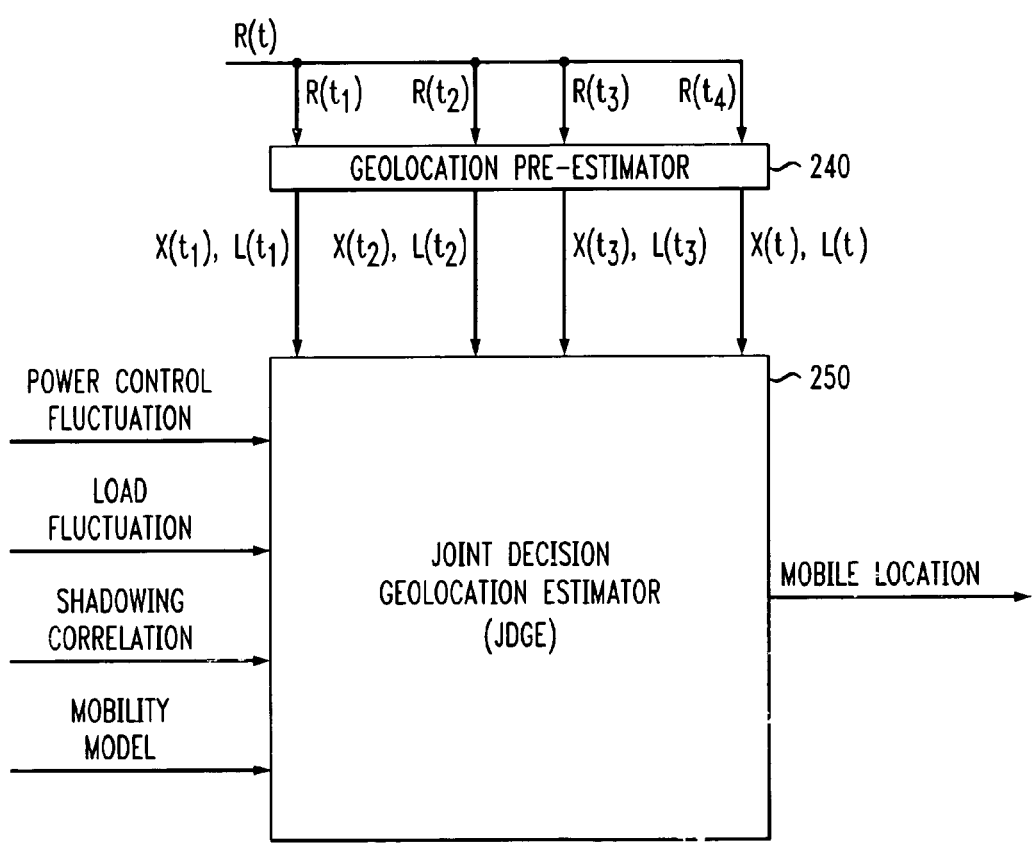
FIG. 2 depicts a system diagram of an embodiment of a geolocation estimation circuit suitable for use in the UMTS wireless network of FIG. 1.

FIG. 2 depicts a system diagram of an embodiment of a geolocation estimation circuit 135 suitable for use in the UMTS wireless network 100 of FIG. 1. Each of the geolocation estimation circuits 1351, 1352 in the network system controller 110 and the mobile unit 130, respectively, comprises a geolocation pre-estimator 2401, 2402 (collectively geolocation pre-estimators 240) and a joint decision geolocation estimator (JDGE) 2501, 2502 (collectively JDGEs 250). The geolocation pre-estimators of the present invention are substantially conventional estimators.

Briefly stated, in the geolocation estimation circuits 1351, 1352 of the network system controller 110 and the mobile unit 130, respectively, a geolocation estimate for the mobile unit 130 is determined by the geolocation pre-estimators 240 and communicated to the JDGEs 250. The geolocation pre-estimators 240 utilize the information recorded by the mobile unit required to support the geolocation process. This information includes for example, time difference of arrival, round trip time, and angle of arrival.

Figure 3:
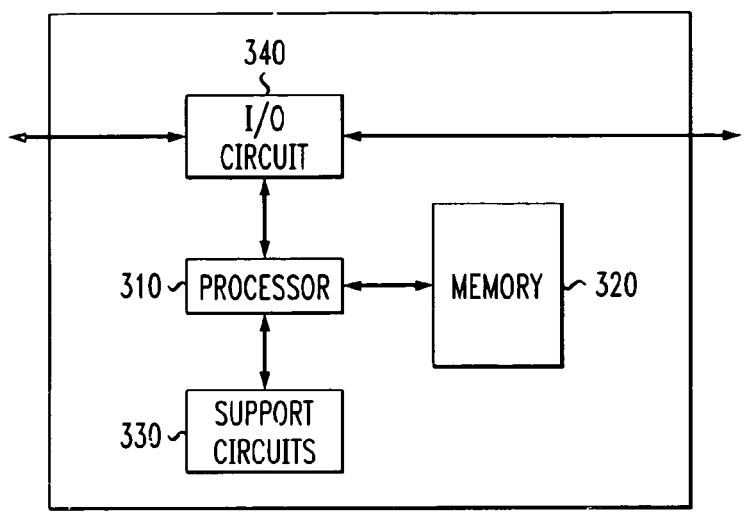
FIG. 3 depicts a high level block diagram of an embodiment of a joint decision geolocation estimator suitable for use in the geolocation estimation circuit of FIG. 2.

FIG. 3 depicts a high level block diagram of an embodiment of a joint decision geolocation estimator (JDGE) suitable for use in the geolocation estimation circuit 135 of FIG. 2. The JDGE 250 of FIG. 3 comprises a processor 310 as well as a memory 320 for storing algorithms, control programs and spectrograms. The processor 310 cooperates with conventional support circuitry 330 such as power supplies, clock circuits, cache memory and the like as well as circuits that assist in executing the software routines stored in the memory 320. As such, it is contemplated that some of the process steps discussed herein as software processes may be implemented within hardware, for example, as circuitry that cooperates with the processor 310 to perform various steps. The JDGE 250 also contains input-output circuitry 340 that forms an interface between the various functional elements communicating with the JDGE 250.

Although the JDGE 250 of FIG. 3 is depicted as a general purpose computer that is programmed to perform various control functions in accordance with the present invention, the invention can be implemented in hardware, for example, as an application specified integrated circuit (ASIC). As such, the process steps described herein are intended to be broadly interpreted as being equivalently performed by software, hardware, or a combination thereof.

Returning to FIG. 2, the JDGEs 250 record the geolocation estimates from the geolocation pre-estimators 240 taken at various times along a time sequence, and utilize that information, along with various system parameters, including power control fluctuation, load fluctuation, shadowing correlation, etc., to provide a more accurate and reliable estimation of the position of the mobile unit 130. Because the functionalities of the geo-location estimation circuits 1351 and 1352 of the UMTS wireless network 100 of FIG. 1 are substantially identical, the following operation will be discussed primarily with respect to the geo-location estimation circuit 1351 within the network system controller 110.

Similar clarification can be made if the mobile terminal is responsible for the geo-location process (self-positioning process).

The inventors have noted that the number and strength of base station pilot signals detected by a mobile unit can fluctuate fairly rapidly; on the timescale of seconds. These fluctuations are due in part to changes in interference power levels caused by power control algorithms, initiation and completion of calls in the serving and neighbor cells, changes in mobile antenna orientation, shadowing and small changes in mobile position, just to name a few. To correct for these fluctuations, the present invention advantageously compares the geolocation estimates for a mobile unit along a sequence of time periods to provide more reliable geolocation estimates for the mobile unit. An algorithm located in the JDGE 250 calculates the position of the mobile unit 130.

In one embodiment of the present invention, a geolocation estimation circuit calculates the position of the mobile unit 130 in two steps. In the first step, the location of the mobile unit 130 is estimated by the geolocation pre-estimator 2401 based on individual measurements and information R(t) from the mobile unit for a sequence of time periods (illustratively four time periods) R(t1), R(t2), R(t3), and R(t4). The estimation algorithm within the geolocation pre-estimator 2401 adopts one of many available conventional geolocation techniques, such as Observed Time Difference of Arrival (OTDOA), which is herein incorporated by reference in its entirety, for estimating the position of the mobile unit 130 and the reliability metric of the estimate. Round Trip Time (RTT) measurements can be used in conjunction with these techniques to reduce the uncertainty domain and increase the geo-location accuracy. Although the embodiment of the present invention is being described as utilizing conventional geolocation techniques, such as OTDOA, for estimating the position of the mobile unit 130 and the reliability metric of the estimate, it will be appreciated by those skilled in the art that, within the concepts of the present invention, various other geolocation techniques can provide measurement inputs to the geolocation pre-estimator 2401 in accordance with the present invention to estimate the location of the mobile unit 130.

The information utilized by the geolocation pre-estimator 2401 to perform the reliability metric of the estimate includes information from the mobile unit regarding from how many of the base stations 120 a pilot signal was received and the strength of the pilot signals received. The resulting position estimate calculated by the geolocation pre-estimator 2401 for each measurement R(t) taken by the mobile unit 130 is denoted as X(t) and the reliability metric of the estimate is denoted as L(t). The resulting position estimate X(t) and the reliability metric L(t) are recorded by the JDGE 2501 for each time period of the time sequence.

In the second step, the geolocation estimates of the geolocation pre-estimator 2401 recorded by the JDGE 2501 are compared to one another to estimate the location of the mobile unit 130. The JDGE 2501 makes the final decision of the position of the mobile unit 130 based on the position estimate X(t) and the reliability metric L(t) from the geolocation pre-estimator 2401 in the first step. That is, a selection algorithm can be implemented with different accuracy and complexity requirement for determining the most accurate position or geolocation estimate. In a maximum likelihood approach, the likelihood of each candidate position is calculated jointly based on the vector of estimates and corresponding likelihood along with other factors discussed below. Then the position with the maximum likelihood is selected. In an alternate embodiment, a user chooses the most reliable position estimate reported by the pre-estimator 2401.

Optionally, other system variables (e.g., power fluctuation, load fluctuation, shadowing correlation, mobility model, and the like) may be considered by the JDGE 2501 to model the correlation between the individual estimates and ultimately decide on the most reliable and accurate location of the mobile unit 130 provided by the geolocation pre-estimator 2401. Mobility models can be used to assist in location prediction. Power control fluctuation, load fluctuation and shadowing will provide information on measurement reliability and correlation.

Figure 4:
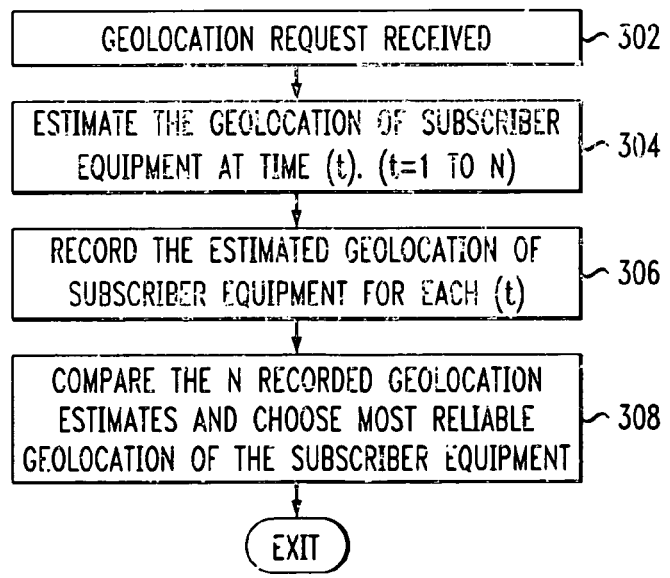
FIG. 4 depicts a flow diagram of an embodiment of a method of geolocation suitable for use in the geolocation estimation circuit of FIG. 2.

FIG. 4 depicts a flow diagram of an embodiment of a method of geolocation in accordance with the present invention. The method 300 is entered at step 302 when a geolocation request is received by a geolocation estimation circuit. At step 304, the location of a mobile unit is estimated by a geolocation pre-estimator in the geolocation estimation circuit of the system component issuing the geolocation request, based on measurements taken by the mobile unit for a sequence of time periods. At step 306, the geolocation estimate of the mobile unit calculated by the geolocation pre-estimator for each time period is recorded in a joint decision geolocation estimator (JDGE) in the geolocation estimation circuit. At step 308, the recorded geolocation estimates calculated by the geolocation pre-estimator are compared to one another in the JDGE to more accurately estimate the location of the mobile unit 130. The JDGE makes the final decision of the current mobile unit position based on the vector of location and reliability information calculated by the geolocation pre-estimator for each time period of the time sequence. The method 300 is then exited.

Figure 5:
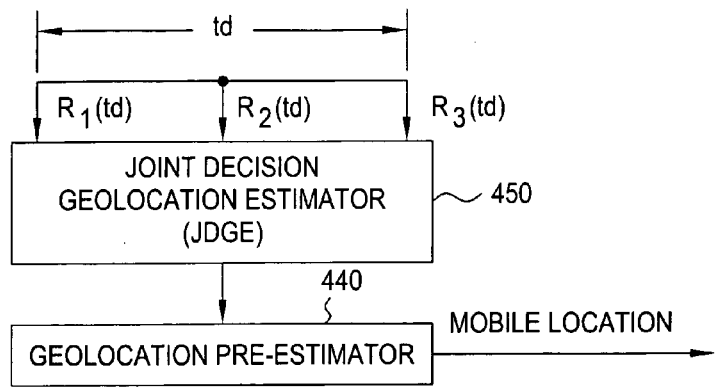
FIG. 5 depicts a system diagram of an alternate embodiment of a geolocation estimation circuit suitable for use in the UMTS wireless network 100 of FIG. 1.

FIG. 5 depicts a system diagram of an alternate embodiment of a geolocation estimation circuit suitable for use in the UMTS wireless network 100 of FIG. 1. The geolocation estimation circuit 435 of FIG. 5 includes substantially the same components as the embodiment of the geolocation estimation circuit 135 of FIG. 2. As in the geolocation estimation circuit 135 of FIG. 2, the geolocation estimation circuit 435 includes a geolocation pre-estimator 440 and a joint decision geolocation estimator (JDGE) 450. As in the geolocation estimation circuit 135 of FIG. 2, the geolocation pre-estimator 440 of FIG. 5 is substantially a conventional estimator.

Briefly stated, in contrast to the geolocation estimation circuit 135 of FIG. 2, in the geolocation estimation circuit 435 a delayed-decision algorithm selects the most reliable measurement R from a mobile unit within a deadline. That is, a deadline (time interval) is set by the geolocation estimation circuit 435 such that within that deadline, measurements of pilot signals from visible base stations are taken by the mobile unit 130. The measurements taken by the mobile unit 130 include information about the pilot signals received from the base stations 120 including how many base station pilot signals were received, the strength of the signals received, the time difference of arrival of the signals received, the round trip time of the signals received, the angle of arrival of the signals received, and the like.

More specifically, if the mobile unit 130 succeeds in reporting measurements from three or more pilot signals from neighboring base stations, triangulation is performed to estimate the location of the mobile unit 130.

If the mobile unit 130 does not succeed in reporting measurements from at least 3 pilot signals from neighboring base stations, the mobile unit 130 will be scheduled to take additional measurements (re-sample) before the expiration of a pre-determined deadline (time interval). The length of the time interval determined by the geolocation estimation circuit 435 is a system parameter that is controlled via the control information flow. It may depend on many system factors, such as system loading, global interference, priority of the geo-location request. If different geo-location priority classes may be identified and formed, the measurement time interval is likely to be dependent on the class priority. Requests from higher priority class may require more precise geo-localization, thus the measurements time interval for their class, and thus the access to the system resources is likely to be longer. This may be supported by incentive plans that offer some benefits to users making requests of lower priority. Typically the higher the interference threshold or request priority, the longer the time interval for measurements sampling has to be. However, any other mapping rules between measurements time interval and system parameters can be used in the invention as long as the chances to get reliable measurements in the given time interval are acceptably high. In order to support this process, geo-location requests that require additional measurements sampling during the time interval, need to be queued at a serving base station during the measurements time interval. This means that in accordance with the present invention, queuing of geolocation requests may happen anytime when not enough pilot signals are detected for triangulation to be successful. The queued requests will be served when the base station deems it advantageous to do so.

The decision to "re-sample" may be made by either the mobile unit 130 or a serving base station. Because the base station has access to information, which could be used to increase the chance that an accurate measurement is made (e.g., base station output power, the level of downlink interference power at the mobile, or other factors), it would be preferable for the decision to re-sample to be made by the base station.

The measurements taken by the mobile unit 130 are recorded by the JDGE 450. Using the measurements of the mobile unit 130, the JDGE 450 would provide the most reliable estimate it could make within the deadline—the most reliable estimate being, for example, the one that was constructed using the largest set of pilot signals. Received signal-to-noise ratio, transmitter timing difference, and propagation environment may also all contribute to the quality of the measurement and subsequently to the estimate chosen by the JDGE 450 as the most reliable estimate.

Figure 6:
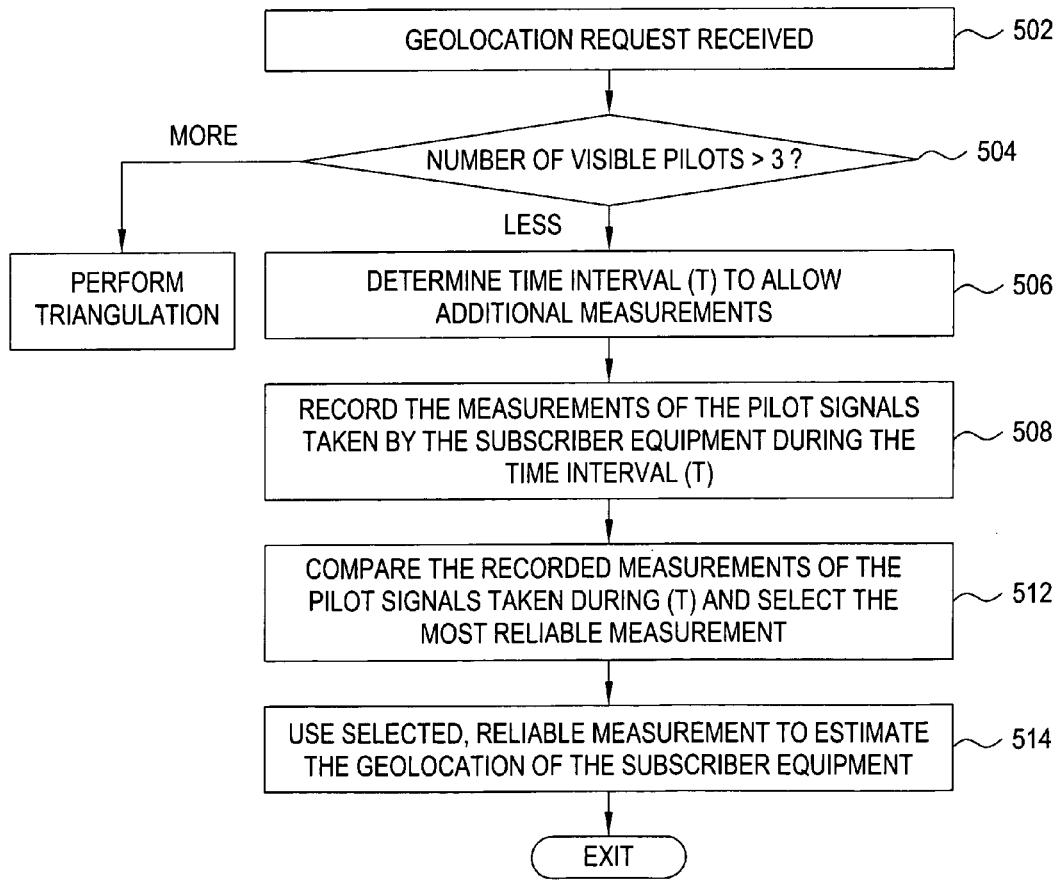
FIG. 6 depicts a flow diagram of an embodiment of a method of geolocation suitable for use in the geolocation estimation circuit of FIG. 4.

FIG. 6 depicts a flow diagram of an embodiment of a method 500 of geolocation suitable for use in the geolocation estimation circuit 435 of FIG. 5. The method 500 is entered at step 502 when a geolocation request is received by a geolocation estimation circuit. At step 504, the method 500 determines how many visible pilots are visible in a measurement taken by a mobile unit. If there are three or more visible pilot signals, the method 500 proceeds to step 506. If there are less than three pilot signals, the method 500 proceeds to step 508.

At step 506, the measurement of the mobile unit is coupled to a geolocation pre-estimator wherein triangulation can be successfully performed utilizing the available three or more pilot signals from the mobile unit measurement. The method 500 is then exited.

At step 508, after determining that there are fewer than three pilot signals in a received measurement from a mobile unit, the method 500 determines a time interval to allow for additional measurements to be taken by the mobile unit. In addition any subsequent geolocation requests are queued at the serving base station.

At step 510, the mobile unit takes additional measurements within the allotted time interval. Each of the measurements by the mobile unit are recorded in a JDGE.

At step 512, any measurements taken by the mobile unit during the determined time interval are compared, and the most reliable measurement is selected.

At step 514, the selected measurement is used by a geolocation pre-estimator to calculate a geolocation estimate for the mobile unit making the geolocation request. The method 500 is then exited.

The geolocation methods 300, 500 of the geolocation circuits 135, 435 of the present invention, also optionally include various system manipulation techniques to improve the accuracy and reliability of the geolocation estimates of a mobile unit. These manipulation techniques are used to increase the signal strength of or the number of the probe signals detected by the mobile unit 130. For example, the geolocation methods of the present invention can further include queuing of the geolocation requests and power management techniques. For queuing of the geolocation requests in accordance with the present invention, if not enough pilot signals are detected in a network-based geolocation request for triangulation to be successful, the requests are queued at the serving base station and served when the serving base station deems it advantageous to do so.

The power management techniques of the present invention for improving the accuracy and reliability of geolocation estimates include, exploiting departures of other calls, delaying of call initiations, forced reduction of power for some calls (if possible), interruption and postponement of some ongoing calls (if possible), handling multiple geolocation requests, and cooperative user behavior.

For the technique of exploiting departures of other calls, the infrastructure may reinitiate the relocation process upon a departure of a high power consuming call, such as, for example, those calls to mobile units located at the border of the cell area, and more generally those calls made from locations where the attenuation of the pilot signal(s) received from the serving base station(s) is likely to be high. It should be noted that in the context of high rate data services provided by 3G networks, high power consuming calls may also be calls close to the serving base station, but the demand in power may be high due to a high data rate. In CDMA systems, a high data rate user's access to system resources is typically governed by a scheduler. In an embodiment regarding the geo-location of users implementing high data rate applications, the scheduler is provided with information concerning the priority of the queued geo-location requests, so that the scheduler may take appropriate actions to reduce the overall interference during the geo-location process. Another important factor is that, in CDMA, the power allocated to users is highly dependent on the user's position in the cell area. More specifically, the inventors have noted a power difference of up to eight times difference between power allocated to a user close to the cell border and a user close to the base station. Users close to the border are those likely to change their active set due to motion, so they are more likely to leave the cell area and release their allocated channels, than users which are closer to the base station. Such users will have a more significant impact in power/interference balance fluctuation than call termination from users closer to base station (which have not consumed an important part of the total distributed power). That is, a departure of a call from the border (which is likely to happen at a higher rate than other calls) could be equivalent in terms of energy consumption of up to 8 departures of calls that are close to the base station. It is just after such departures that the infrastructure can reinitiate the relocation process.

In delaying of call initiations, the serving base station can delay the access of new calls once the output power has decreased under a certain threshold (as a result of call departures for example) to allow successful completion of the geolocation process, based on the priority of access requests.

Forced reduction of power for some calls (if possible) is implemented to lower the total output power of a system to allow successful and accurate completion of the geolocation process.

Interruption and postponement of some ongoing calls, if possible, is implemented to decrease the total transmission power of a system and minimize the near far interference conditions at a mobile unit subject to geolocation. This is possible, for example, if non delay-sensitive data calls (NRT data) are being served by the serving base station.

The handling of multiple geolocation requests may be accomplished by introducing access priorities. For example, multiple requests are likely to wait in the same waiting queue. Depending on the user profile, different priorities can be assigned to different requests. The different requests are allocated different access priorities to determine the order in which the requests are serviced and different deadlines (time limits) to increase the success of measuring pilot signals from the associated base stations. Associated with incentive plans, if any, may confine the resolution time to measure at least 3 pilots from different location to be no more than a targeted deadline per class.

For cooperative user behavior, a user may be instructed via downlink information to move in a direction that is communicated by the serving base station (in this case away from the serving base station) to exit the near-far interference zone.

While the forgoing is directed to various embodiments of the present invention, other and further embodiments of the invention may be devised without departing from the basic scope thereof. As such, the appropriate scope of the invention is to be determined according to the claims, which follow.

What is claimed is:

1. A method, comprising:
   calculating a plurality of geolocation estimates of a wireless communication device for a plurality of time periods, wherein each geolocation estimate comprises a position estimate and a reliability metric associated with said position estimate, wherein said reliability metric is determined using a number of base stations from which a pilot signal was received during said time period; and
   selecting from said plurality of calculated geolocation estimates a most reliable geolocation estimate of said wireless communication device.

2. The method of claim 1, wherein said most reliable geolocation estimate comprises the geolocation estimate having associated with it the pilot signals with the greater signal strengths relative to the other detected base station pilot signals.

3. The method of claim 1, wherein said wireless communication device is a mobile telecommunications device.

4. The method of claim 1, wherein said calculating comprises:
   subjecting information received from said wireless communication device to a positioning technique to determine thereby a range and direction of said wireless communication device relative to at least one base station;
   said information received from said wireless communication device comprising detected pilot signal measurements from said at least one base station.

5. The method of claim 4, wherein information regarding respective locations of the detected base stations is stored in said wireless communication device and used to determine said range and direction.

6. The method of claim 5, wherein said information regarding the respective locations of the detected base stations is transmitted to said wireless communication device by a network system controller.

7. The method of claim 4, wherein said positioning technique comprises an Observed Time Difference of Arrival (OTDOA) technique.

8. The method of claim 4, wherein a Round Trip Time (RTT) measurement is used in conjunction with said positioning technique to increase the geolocation accuracy.

9. The method of claim 1, wherein system manipulation techniques are used to increase the accuracy and reliability of geolocation estimates.

10. The method of claim 9, wherein said system manipulation techniques comprise power management techniques, said power management techniques comprising at least one of exploiting departures of other calls, delaying of call initiations, forcing reduction of power for some calls, interruption and postponement of some ongoing calls, handling multiple geolocation requests, and cooperative user behavior.

11. A method, comprising:
    receiving information from a wireless communication device, said information comprising measurements taken by said wireless communication device of detected pilot signals from at least one base station;
    determining a time interval in which said wireless communication device continues to take measurements when fewer than three (3) base stations are detected by said wireless communication device;
    selecting a most reliable measurement taken by said wireless communication device among the measurements taken by said wireless communication device when fewer than three (3) base stations are detected by said wireless communication device; and
    calculating a geolocation estimate of said wireless communication device using said selected most reliable measurement.

12. The method of claim 11, wherein said most reliable measurement is a measurement comprising the pilot signals with the greater signal strengths relative to the other detected pilot signals.

13. The method of claim 11, wherein said wireless communication device is a mobile telecommunications device.

14. The method of claim 11, wherein said calculating comprises:
    subjecting said selected measurement to a positioning technique to determine thereby a range and direction of said wireless communication device relative to at least one base station.

15. The method of claim 14, wherein information regarding the location of the detected base stations is stored in said wireless communication device and used to determine said range and direction.

16. The method of claim 15, wherein said information regarding the location of the detected base stations is transmitted to said wireless communication device by a network system controller.

17. The method of claim 14, wherein said positioning technique is an Observed Time Difference of Arrival (OTDOA) technique.

18. The method of claim 14, wherein a Round Trip Time (RTT) measurement is used in conjunction with said positioning technique to increase the geolocation accuracy.

19. The method of claim 11, wherein system manipulation techniques are used to increase the accuracy and reliability of geolocation estimates.

20. The method of claim 19, wherein said system manipulation techniques comprise power management techniques, said power management techniques comprising at least one of exploiting departures of other calls, delaying of call initiations, forcing reduction of power for some calls, interruption and postponement of some ongoing calls, handling multiple geolocation requests, and cooperative user behavior.

21. The method of claim 11, further comprising:
performing a triangulation operation to calculate a geolocation estimate of said wireless communication device when three (3) or more pilot signals from different base stations are detected by said wireless communication device.

22. An apparatus, comprising:
a geolocation estimator, for calculating geolocation estimates of a wireless communication device for a plurality of time periods, wherein each geolocation estimate comprises a position estimate and a reliability metric associated with said position estimate, wherein said reliability metric is determined using a number of base stations from which a pilot signal was received during said time period; and
a joint decision geolocation estimator (JDGE), said JDGE comprising a memory for storing information and program instructions, and a processor for executing said instructions, said JDGE configured to select, from said plurality of calculated geolocation estimates, a roost reliable geolocation estimate of said wireless communication device.

23. The apparatus of claim 22, wherein said plurality of geolocation estimates are stored in the memory of said JDGE.

24. The apparatus of claim 22, wherein said geolocation pre-estimator is a conventional estimator.

25. An apparatus, comprising:
a joint decision geolocation estimator (JDGE), said JDGE comprising a memory for storing information and program instructions, and a processor for executing said instructions, said JDGE configured for:
receiving information from a wireless communication device, said information comprising measurements taken by said wireless communication device of detected pilot signals from at least one base station;
determining a time interval in which said wireless communication device continues to take measurements when fewer than three (3) base stations are detected by said wireless communication device; and
selecting a most reliable measurement taken by said wireless communication device among the measurements taken by said wireless communication device when fewer than three (3) base stations are detected by said wireless communication device; and
a geolocation estimator, said geolocation estimator operable for calculating a geolocation estimate of said wireless communication device using said selected most reliable measurement.

26. The apparatus of claim 25, wherein said apparatus is further configured for:
performing a triangulation operation to calculate a geolocation estimate of said wireless communication device when three (3) or more pilot signals from different base stations are detected by said wireless communication device.

27. The apparatus of claim 25, further comprising a queuing facility to store the geolocation requests that need to be processed within said time interval.

* * * * *